July 25, 1939.  T. M. BERRY  2,167,484

FOLLOW-UP DEVICE

Filed Oct. 29, 1938

Inventor:
Theodore M. Berry,
by Harry E. Dunham
His Attorney.

Patented July 25, 1939

2,167,484

UNITED STATES PATENT OFFICE 2,167,484

FOLLOW-UP DEVICE

Theodore M. Berry, Schenectady, N. Y., assignor to General Electric Company, a corporation of New York Application October 29, 1938, Serial No. 237,793

8 Claims. (Cl. 172—239)

My invention relates to a motion transmitting follow-up device and its control, and its object is to provide a frictionless follow-up device in which there is, or need be, no electrical or mechanical connection between the moving part, the motion of which it is desired to reproduce and the part which reproduces such motion. For convenience, these parts may be referred to as transmitter and receiver respectively.

In carrying my invention into effect I make use of a photo-electric control arrangement employing light polarizing screens, the movements of which are synchronous with the transmitter and receiver and which preferably differentially vary a pair of light beams in accordance with any difference between the movements of transmitter and receiver. A pair of photo tubes respond to the amount of light transmitted and are included in the control of electric apparatus which drives the receiver in such manner as to cause its movement to correspond to that of the transmitter.

Figure 3:
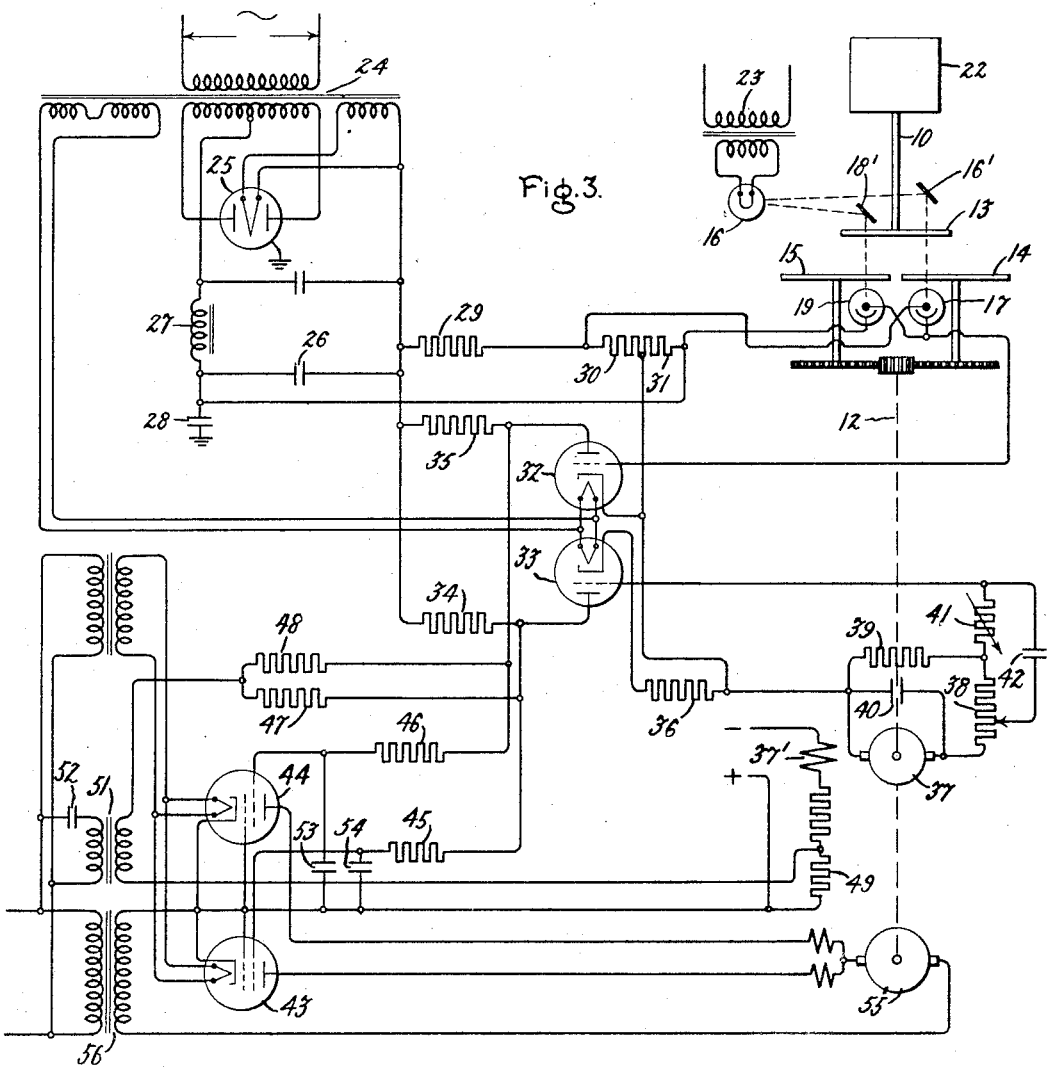
Figure 1:
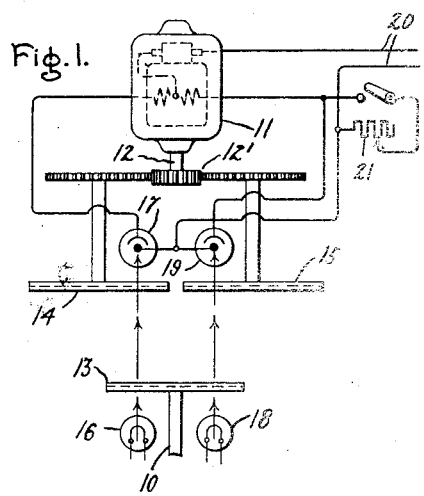
Figure 2:
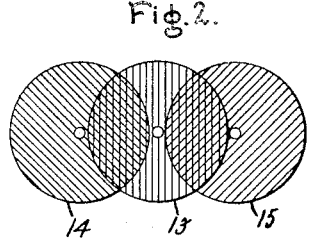

The features of my invention which are believed to be novel and patentable will be pointed out in the claims appended hereto. For a better understanding of my invention, reference is made in the following description to the accompanying drawing in which Fig. 1 represents a plan view of a preferred arrangement of the polarized light screens on the transmitter and receiver and the light beam channels therethrough and also somewhat schematically, the control principle used. Fig. 2 is a face view of the polarized light screen, the directions of polarization being indicated by parallel lines, and Fig. 3 shows control circuits and apparatus that may be employed with the follow-up apparatus of my invention.

Referring particularly to Fig. 1 of the drawing, it is assumed that the shaft 10 is a rotary shaft such as the shaft of a clock, a meter, or instrument, the rotary movement of which it is desirable to reproduce but without taking any power from shaft 10. Likewise it may be desirable to reproduce the movement of such shaft without making any electrical or mechanical connection thereto. 11 represents any suitable type of motor for driving a shaft 12 such that shaft 12 will reproduce the rotational movements of shaft 10 and it is the purpose of my invention to provide apparatus by means of which this may be accomplished and comply with the desirable requirements above mentioned. On shaft 10 of the transmitter and rotating with it is a light-polarizing disk 13. The shaft 12 of the receiver drives two similar light-polarizing disks 14 and 15. Disks 14 and 15 are mounted side by side on parallel shafts driven through gearing at 12' so as they will rotate in the same direction and at the same speed when motor 11 operates. In the illustration, disk 13 lies in a plane parallel with the plane of disks 14 and 15 such that sectors on opposite diameters of disk 13 face the sectors of disks 14 and 15 which are adjacent each other. This is best illustrated in Fig. 2. The overlapping portions of disks 13 and 14 form light-polarizing screens in the path of a light beam from a light source 16 to a light sensitive cell 17. Also, the overlapping portions of disks 13 and 15 constitute another pair of light polarizing screens in the path of another light beam from a light source 18 to a different light sensitive cell 19. Light sources 16 and 18 may be considered as a single light source and a single light source will generally be used to prevent errors due to lamp variations. In Fig. 2 the parallel lines which are drawn across the several disks represent the axes of light-polarization of such disks. It is noted that disks 14 and 15 are polarized at right angles to each other and that if these disks rotate in either direction by any amount, their lines of polarization will remain at right angles to each other since they are mechanically geared to rotate at the same speed and in the same direction. The transmitter disk 13 in the rotary position represented in Fig. 2 has its axis of light-polarization at an angle of 45 degrees to the polarization axes of both disks 14 and 15. This is the balanced arrangement where an equal amount of light will pass through the screens in both light channels represented by the arrows in Fig. 1. If, now, disk 13 be rotated 45 degrees counter-clockwise while disks 14 and 15 remain stationary, the polarizing axes of disks 13 and 14 will become parallel and transmit a maximum amount of light through channel 16—17. At the same time the polarizing axes of disks 13 and 15 will become 90 degrees apart and transmit a minimum amount of light through channel 18—19. If, on the other hand, disk 13 be rotated 90 degrees in a clockwise direction from the position shown with disks 14 and 15 remaining stationary, the light from lamp 16 to cell 17 will be cut off and a maximum amount of light will pass through channel 18—19. For lesser angles of relative rotation of disk 13 with respect to disks 14 and 15 the light unbalance between the two channels will be correspondingly less but will vary in the same way as described above for the two different directions of relative rotation from the balanced condition.

In Fig. 1, I have indicated motor 11 as being a reversible electric motor supplied from a source 20 and have represented the power circuit for one direction of rotation as going through light sensitive device 19 and the power circuit for the other direction of rotation as going through light sensitive device 17. If it be assumed that the light sensitive devices are resistances which vary inversely as the amount of light falling thereon and that device 19 passes motor current for a clockwise direction of rotation of disks 14 and 15 as viewed in Fig. 2, and device 17 passes motor current for the opposite direction of rotation, the arrangement then represents in principal my frictionless follow-up invention. When the rotational relationship of the disks is as shown in Fig. 2, the motor currents for opposite directions of rotation are balanced and the motor does not run. If the disk 13 be turned a few degrees clockwise, more light passes through disks 13 and 15 and less through disks 13 and 14, which causes the motor to start and rotate disks 14 and 15 clockwise the few degrees until the motor is stopped by a return to the balanced condition. Similarly, for the opposite direction of rotation. If disk 13 rotates continuously in the clockwise direction, disks 14 and 15 will continue to be driven in a clockwise direction at the same speed because the control is just as effective when the disks are in motion at any speed as it is when they merely oscillate a few degrees. The control depends upon the relative rotation of the disks and not their revolutions per minute.

It will at once be apparent that the two disks 14 and 15 might be driven by the transmitter and the single disk 13 driven by the receiver. A single light source split into two beams might replace the two lamps, see Fig. 3. The transmitter and receiver might be located some distance apart so long as the light channels are maintained and it is not essential that the disks rotate in parallel planes since the light beams may be turned through and desired angle by means of mirrors, as shown for example in Fig. 3. Nor is it essential that the lines of polarization of disks 14 and 15 be exactly 90 degrees apart. The shafts 10 and 12 may rotate at the same or different speeds and in the same or opposite directions so long as the disks 13 and 14 rotate at the same speed and in the same direction.

In some cases only one light channel may suffice. Let us assume for example that lamp 18, Fig. 1, gives out and that disk 15 and photo cell 19 thus becomes useless. The apparatus would still operate as a follow-up device where the transmitter always rotated in a counter-clockwise direction of rotation. However, the device as thus crippled may still be used as a satisfactory follow-up device for both directions of rotation by the following expedient. In place of supposed useless cell 19 we now connect a constant resistance 21 adjusted to have a value equal to the average resistance of device 17, i. e., its resistance when disks 13 and 14 have their polarized axes at about 45 degrees as shown in Fig. 2. Under these conditions, then, the motor 11 would be equally energized for opposite directions of rotation and disk 13 would stand still. Turning of disk 13 counterclockwise with respect to disk 14 would increase its excitation for a counter-clockwise rotation of disk 14 and cause it to turn in that direction, and turning disk 13 clockwise with respect to disk 14 would decrease the motor excitation for counter-clockwise rotation of disk 14 and cause it to run clockwise. It is thus seen that for some purposes photo cell 19 and disk 15 may be dispensed with but to obtain greater sensitivity and to eliminate errors due to varying light intensity, a single light source and the differential control arrangement is to be preferred.

In general the control action of the light-sensitive devices should be amplified if any appreciable amount of power is to be available in the follow-up receiver, and in Fig. 3 I have illustrated a practicable arrangement for providing such amplification.

In Fig. 3 the parts which are similar to those already explained are indicated by like reference characters. 22 may represent a metering device, the rotary action of which is to be reproduced on shaft 12. 23 represents a transformer for supplying energy for the lamp 16. 16' and 18' are mirrors.

The motor 55 of Fig. 3 corresponds in general to the motor 11 of Fig. 1. However, in Fig. 3 amplifying control devices are included between the photo tubes 17 and 19 and the circuits of motor 55. In addition in Fig. 3 I have provided a generator 37 driven by motor 55 which produces a voltage which is introduced into the amplifying control system for motor 55 for the purposes of stabilizing such control system. This is an anti-hunting feature.

It is believed that the details of the amplifying control system may vary considerably and I do not wish to confine my invention to the details of the amplifying control represented in Fig. 3 now to be described.

The transformer 24, rectifier tube 25, condensers 26 and 28 and reactor 27 shown in the upper left of Fig. 3 constitute rectifier equipment for providing a suitable direct current voltage supply for primary and secondary bridge control circuits. The voltage from the rectifier equipment is connected across resistances 29, 30 and 31 and the resistances 30 and 31 are connected in a bridge circuit with photo cells 19 and 17. This is what I term the primary bridge circuit. Any unbalance of the light striking photo cells 19 and 17 unbalances this primary bridge circuit and produces a corresponding voltage across the bridge which is applied between the filament and grid of a triode 32.

Triode 32 is one arm of what I term the secondary bridge circuit. The other arms of the secondary bridge are the triode 33 and the resistances 34 and 35. The triodes 32 and 33 are the variable impedance arms of this secondary bridge. This bridge is also supplied by direct current from the rectifier equipment above mentioned. The impedance of triode arm 32 is controlled by the direction and extent of unbalance of the primary bridge. The impedance of triode arm 33 of the secondary bridge is controlled primarily by the stabilizing generator 37 and thus it is through tube 33 that this anti-hunting control is introduced into the system. The direct current stabilizing generator 37 has a separately excited field winding 37'. The voltage which is generated by 37 when shaft 12 turns is applied across resistors 38—39 in series and across a filter capacitor 40. A part of the voltage of the stabilizing generator is added to a normal D. C. bias for triode 33 supplied by the drop in resistance 36, and is applied to the grid of triode 33. The biasing voltage which is supplied by the generator 37 and applied to the grid of triode 33 is taken off of resistance 38 through a branch connection, one branch containing an adjustable resistance 41 and the other branch containing a condenser 42 and being adjustable along resistance 38. This arrangement makes the biasing voltage contributed by the stabilizing generator 37 dependent on the rate of change of the voltage across resistor 38 and also the rate of change of speed of shaft 12.

The follow-up motor 55 is a reversible, variable speed, direct current motor having its supply circuit for one direction of rotation through a gaseous tube or thyratron 43 and for the other direction of rotation through thyratron 44. 56 is the transformer supply for motor 55. The thyratrons 43 and 44 are controlled by the extent and direction of unbalance of the secondary bridge, 32—33—34—35. This bridge circuit is connected to the grid resistors 47 and 48 of the grids of thyratrons 43 and 44 through current limiting resistors 45 and 46. Normal grid potential for thyratrons 43 and 44 is furnished by a D. C. potential across resistor 49 in series with an A. C. potential across the secondary of a transformer 51.

This A. C. potential is approximately 90 degrees out of phase with the anode potential of the thyratrons due to the out-of-phase current through capacitor 52 in series with the primary of transformer 51. Capacitors 53 and 54 are filter capacitors.

The D. C. potential supplied from the bridge circuit comprising the vacuum tube triodes 32 and 33 and their anode resistors 34 and 35 controls the current in the anode circuit of the thyratrons 43 and 44 in a well-known manner by allowing them to pass current through a greater or less portion of the positive halves of the A. C. cycles of anode voltage, depending on the magnitude and polarity of the potential applied to their grids.

The anode current of each thyratron passes through one field winding of the split field series motor 55, the current of both passing through the armature so that any difference in the anode currents will cause a rotation of the armature of motor 55 and in a direction depending upon which field current is the greater. This rotation will in turn rotate the polarized disks 14 and 15 and effect the beams of light striking the photo cells in such a manner that the bridge circuit in which they are connected is brought to a condition of balance where the secondary bridge circuit will cause the equalization of the anode currents in the thyratrons and cause the motor 55 to come to a "balanced" position.

The armature of generator 37 turning with the armature of motor 55 generates a voltage which is applied to the grid of triode 33 so that the rotation of the motor 55 causes the secondary bridge circuit to become more nearly balanced. If, in turning, the shaft 10 is suddenly slowed down or stopped, the "secondary" bridge circuit will reach a balance before the primary bridge does, due to the voltage generated by 37 and slowing down before the primary bridge reaches a balance, the secondary bridge will have passed through the balance point and the current in motor 55 will be passing through the other field winding, thereby abruptly slowing down or stopping the motor.

When shafts 10 and 12 are standing still and the primary bridge is balanced due to an equal amount of light falling on cells 17 and 19, the secondary bridge is balanced and an equal amount of current flows in the opposed field windings of motor 55, and it is held at standstill. If, now, shaft 10 is turned, the light balance on cells 17 and 19 is disturbed, causing an unbalance of the bridges in such a direction as to cause motor 55 to start in the direction to rebalance the bridges. If shaft 13 continues to turn, the balance is not quite restored but sufficient of an unbalance remains to keep motor 55 running and closely following the movements of shaft 10. When shaft 12 runs, the stabilizing generator 37 contributes a control voltage. The control voltage contributed by the stabilizing unit depends not only on the actual speed of shaft 12 but also on the rate of change of speed of shaft 12.

Following an unbalance of the primary and secondary bridges and a following movement of shaft 12, the action of the stabilizing unit has a tendency to rebalance the secondary bridge before the primary bridge is restored to balance. This stabilizing action is, then, to check the following action of motor 55 and shaft 12 by an amount sufficient to prevent shaft 12 from overrunning shaft 10 and causing an unbalance and a hunting control action of the primary bridge in the opposite direction. This checking action varies in proportion to the need since it is greater when the speed of shaft 12 is high and the rotational changes occur rapidly. Hence, it prevents hunting of the control system and enables shaft 12 to follow shaft 10 closely and accurately under all conditions in either direction of rotation. The magnitude of this anti-hunting action may be adjusted to the correct amount by varying resistance 41 and the position of the tap from condenser 42 to resistance 38. The control action is extremely quick because of the practically instantaneous response of the light cells 17 and 19, and the tubes 32, 33, 43, and 44 to any change calling for a control action. The control response of motor 55 and generator 37 is likewise quick because those machines are always energized.

It will be understood that motor 55 may be a powerful motor and may drive a considerable load in addition to the control parts indicated. For example, motor 55 might be used to drive a synchronous generator feeding a synchronous motor clock system. If then, 22 was an accurate clock, the follow-up apparatus would act as a master clock to hold clock time frequency.

What I claim as new and desire to secure by Letters Patent of the United States is:

1. In a control system, a light source, a pair of light-sensitive devices, two mechanically independent rotary systems, polarized light screens rotated by said rotary systems, there being a screen driven by each system interposed between the light source and one of the light-sensitive devices, and a screen driven by each system interposed between the light source and the other light-sensitive device, the polarizing arrangement being such that as one rotary system rotates relative to the other in one direction of rotation, the light falling on one light-sensitive device increases and the light falling on the other light-sensitive device decreases, motor means for rotating one of said rotary systems and means responsive to said light-sensitive devices for controlling said motor so that the rotary system driven by it will follow the rotary movement of the other rotary system.

2. In a control system, a pair of light-polarizing disks mounted side by side in the same plane, means for rotating said disks in the same direction and at the same speed, a third light-polarizing disk mounted for rotation in a plane parallel to the pair of disks and on an axis of rotation substantially midway between the axes of rotation of said pair of disks, opposite sectors of the third disk overlapping adjacent sectors of the pair of disks, a light source and a pair of light-sensitive devices, the two sets of overlapping disk sectors being interposed between said light source and the two light-sensitive devices, said pair of light-polarizing disks having their axes of polarization at an angle of approximately 90 degrees whereby as said pair are rotated relative to the third disk, the light falling on the pair of light-sensitive devices varies inversely.

3. In a control system, a rotary system having a pair of rotary light-polarizing disk screens connected to rotate at the same speed, a second rotary system having a third rotary light-polarizing disk screen, a light source, a pair of light-sensitive devices, one of said pair of screens and the third screen being interposed in a path of light from said source to one of said light-sensitive devices, and the other of said pair of screens and the third screen being interposed in a path of light from said source to the other of said light-sensitive devices, said pair of screens having their polarizing axes at such an angle that the amount of light falling on the two light-sensitive devices varies inversely as the pair of disks are rotated relative to the third disk, and means responsive to the differential control of light falling upon said light-sensitive devices for controlling the rotation of one of said rotary systems so that it will follow the rotation of the other rotary system.

4. A control system comprising a first rotary shaft, a second rotary shaft and a frictionless follow-up system for causing rotational movements of the second shaft in proportion to the rotational movements of the first shaft and in a direction determined by the direction of rotation of the first shaft, said system comprising a reversible electric motor for operating the second shaft, a source of light, a pair of light-sensitive devices controlling the energization of said motor for opposite directions of rotation, light-polarizing means rotated by the first rotary shaft and light-polarizing means rotated by the second shaft, said light-polarizing means being interposed in the paths of light between said light source and light-sensitive devices, for differentially controlling the relative amount of light falling on said pair of light-sensitive devices in accordance with relative rotational movements of the light-polarizing means rotated by said shafts.

5. A control system comprising first and second rotary shafts and a frictionless follow-up system for causing rotational movements of the second shaft proportional to the rotational movements of the first shaft, said system comprising a light source, a pair of light-sensitive devices, a pair of light-polarizing means interposed between said light source and each light-sensitive device, one light-polarizing means of each pair being driven by the first shaft and the other light-polarizing means of each pair being driven by the second shaft, one pair of light-polarizing means being arranged to reduce the passage of light while the other pair is arranged to increase the passage of light for a given direction of relative rotational movement between said shafts and vice versa for the opposite direction of relative rotational movement between said shafts, an electric motor for rotating said second shaft and amplifying means controlled by the light-sensitive devices for differentially controlling the operation of said motor to cause its rotational movements to be proportional to the rotational movements of the first shaft.

6. A control system comprising first and second rotary shafts and a frictionless follow-up system for causing rotational movements of the second shaft proportional to the rotational movements of the first shaft, said system comprising a light source, a pair of light-sensitive devices, a pair of light-polarizing means interposed between said light source and each light-sensitive device, one light-polarizing means of each pair being driven by the first shaft and the other light-polarizing means of each pair being driven by the second shaft, one pair of light-polarizing means being arranged to reduce the passage of light while the other pair is arranged to increase the passage of light for given direction of relative rotational movement between said shafts and vice versa for the opposite direction of relative rotational movement between said shafts, an electric motor for rotating said second shaft, amplifying means controlled by the light-sensitive devices for differentially controlling the operation of said motor to cause its rotational movements to be proportional to the rotational movements of the first shaft, and means responsive to the rate of change of rotational movement of the second shaft for checking the controlling action of said motor to prevent hunting of said control.

7. A control system comprising first and second rotary shafts, a follow-up system for causing rotary movements of the second shaft proportional to the rotary movements of the first shaft, said system comprising a light source, a pair of photo cells, means interposed between said light source and one photo cell and operated by relative rotation of said shafts for varying the amount of light transmitted, means interposed between said light source and the other photo cell and operated by relative rotational movement of said shafts for varying the amount of light transmitted, said two light-varying means acting differentially, one increasing the transmission of light while the other decreases the transmission of light and vice versa for opposite directions of relative rotational movement between said shafts, a reversible electric motor for driving the second mentioned shaft, a pair of gaseous tubes through which said motor is energized for opposite directions of rotation, a control system for said tubes including a bridge circuit in which said photo cells are included for controlling the relative flow of current through said tubes, a generator driven by said motor, circuit means for obtaining a voltage from said generator proportional to its rate of change of speed and introducing it into the control system of said tubes, said photo cell control serving to cause energization of said motor in a manner to cause the second shaft to follow the rotational movements of the first shaft and the voltage introduced into said control system from the generator tending to check the photo cell control to prevent hunting of said control system.

8. A follow-up control comprising first and second rotary shafts and means for causing rotary movement of the second shaft proportional to rotary movement of the first shaft, said means comprising a light source, a pair of photo tubes, a light channel between said source and each tube, said light channels each having interposed therein means operated in response to the relative rotation between the first and second shafts for varying the amount of light transmitted to the photo cells, said two light-varying means acting differentially one increasing the light transmitted to one cell while the other decreases the light transmitted to the other cell and vice versa, depending upon the direction of relative rotational movement between said shafts, a reversible electric motor for driving the second shaft, a pair of gaseous tubes through which said motor is energized for opposite directions of rotation, a primary bridge circuit in which said photo cells are included, a secondary bridge circuit including a pair of vacuum tubes, one of which tubes is controlled by the unbalance of the primary bridge circuit, a generator driven by said motor, circuit means for deriving a voltage from said generator proportional to its rate of change in speed for controlling the second vacuum tube of the secondary bridge circuit, connections for controlling the gaseous tubes from the secondary bridge circuit, the control of the photo-tube bridge circuit being in a direction to cause rotation of the second shaft proportional to the first shaft and the control resulting from the voltage derived from the generator tending to rebalance the secondary bridge to prevent hunting of said follow-up control system.

THEODORE M. BERRY.